Patented Oct. 18, 1932

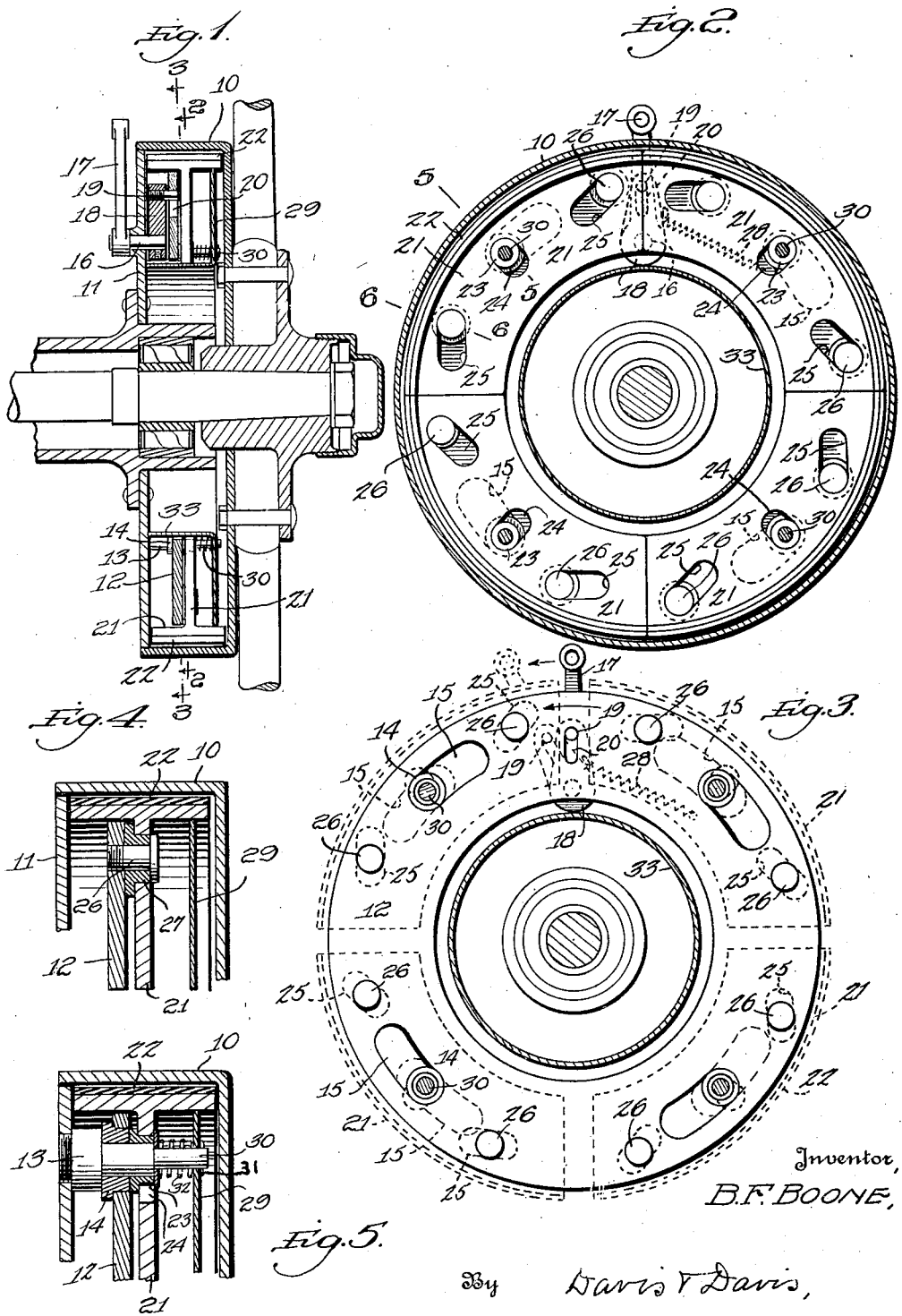

1,883,757

UNITED STATES PATENT OFFICE

BENJAMIN F. BOONE, OF DAYTONA BEACH, FLORIDA

AUTOMOBILE BRAKE

Application filed October 15, 1929. Serial No. 399,778.

The object of this invention is to provide a simple mechanism whereby braking power may be quickly and efficiently applied to the interior of the brake-drum and whereby, when the brake is off, the parts will be prevented from rattling, as more fully hereinafter set forth.

In the drawing annexed—

Fig. 1 is a vertical sectional view;

Fig. 2 is a sectional view on the line 2—2 of Fig. 1;

Fig. 3 is a sectional view on the line 3—3 of Fig. 1; the brake-shoe-segments being shown in dotted lines in operative position;

Fig. 4 is a detail section on the line 6—6 of Fig. 2;

Fig. 5 is a detail sectional view on the line 5—5 of Fig. 2.

Referring to the drawing annexed by reference-characters, 10 designates the usual brake-drum fastened to the wheel, and 11 designates the usual disk rigidly fastened to the axle-housing in position to close the open face of the drum. A rotatable ring 12 is mounted on four studs 13 projecting inwardly from the disk 11 at equidistant points around the same, the studs being preferably provided with anti-friction rollers 14 where they pass through the ring 12; the holes 15 in the ring 12, through which the studs pass, are circumferentially elongated to provide for a limited rotary movement of the ring. This ring 12 may be rotated back and forth, to apply the brake or to release it, by any suitable means; in the present instance, I have shown a short rock-shaft 16 journalled in the disk 11 and having attached to its outer end an operating arm 17 and to its inner end an operating-arm 18 whose outer end is provided with a pin 19 working in a radial slot 20 formed in the rotary ring 12.

Mounted on the inner face of the ring 12 is a plurality of brake-shoe-segments 21, four being shown in the present instance, each having a broad segmental flange at its outer edge adapted to impinge directly, or indirectly through the medium of a suitable brake-lining 22, against the inner face of the brake-drum 10. Each of the segments is engaged by the extended end of one of the studs 13 and, for anti-friction purposes, this extended end of the stud may be provided with a roller 23; and, to enable the brake-shoe-segments to have a rotary movement with respect to the ring 12, the hole through which the stud 13 extends is radially elongated, as at 24, the length of these radial slots 24 being such that the segments may have an outward movement sufficient to enable them to exert a braking action on the brake-drum 10 and an inward movement sufficient to permit the adjacent ends of the segments, when they are in off position, to abut against each other, as particularly shown in Fig. 2, to thereby assist in preventing rattling.

To move the segments outwardly into braking action when the ring 12 is moved in one direction and to move them inwardly into off position when the ring is moved in the other direction, I provide each segment with a pair of inclined (i. e., tangential) slots 25 and engage each of these slots on a stud 26 carried by said ring 12, the stud being preferably provided with a roller 27 for anti-friction purposes. With this construction, it will be observed that the turning of the ring 12 toward the left, Fig. 2, will force all four segments simultaneously outwardly against the inner face of the brake-drum, and the turning of the ring in the opposite direction will withdraw the segments into abutting relation. To normally restore the parts to off position, I provide a retractile spring 28 which connects the ring 12 to the inside lever 18. I have shown four segments, but it will be understood that a lesser or greater number may be employed without departing from my invention. To assist in preventing the segments from rattling when in off position and to keep dust and other foreign matters away from the working parts of the device, I provide a disk 29 located within the brake-drum, whose diameter is such that, when the segments are in their off position, their outer flanges rest in close proximity to the perimeter of the disk. I support this disk on pins 30 which extend inwardly from the ends of the studs 13, the disk being fastened removably on the ends of these studs by split pins 31, shown in Fig. 5, and, to assist in holding this disk in place, I provide the pins 30 with expansible spiral springs 32 which surround the pins between the disk and the adjacent faces of the brake-segments. This disk, at its inner edge, is provided with a hub-like flange 33 which extends through the ring 12 and engages or extends close to the adjacent face of the stationary disk 11 carried by the axle-housing.

The principal advantages of this invention are as follows:

1. The force of the brake-shoe is such that pressure on the face of the brake-shoe is evenly distributed over its entire surface in a true radial direction.

2. The shoes when in an off position have their ends in abutting relation, thereby providing ample area for the brake-lining or friction material and utilizing as nearly as possible all the braking surface, to thereby increase the efficiency of the brake.

3. The means for releasing the brake-shoe is positive, preventing any of the shoes sticking or dragging on the brake-drum when released.

4. The maximum braking force is obtained with a minimum of effort, thereby eliminating the necessity of any booster or auxiliary brake.

5. Owing to the simplicity of the mechanism, there is no adjustment necessary on any of the shoes; the only adjustment necessary, if any, would be changing the relative position of the operating-arm 17 to the usual pull-rod which would be connected thereto.

6. The parts may be assembled or disassembled quickly without the necessity of special equipment.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim as new is:

1. In a brake, a wheel carrying a brake-drum, a stationary disk carried by the axle-housing, a rotatable ring within the brake-drum, means exterior to the brake-drum for actuating said ring, a plurality of studs carried by said disk for supporting said ring, said studs extending through circumferential slots in the ring to permit the ring to rotate back and forth, and a plurality of brake-shoe-segments mounted on said disk in such manner as to be free to move radially inwardly and outwardly with respect to said ring, the means for causing this movement of the segments consisting of a pair of tangential slots in each segment and studs working in said slots and carried by said ring.

2. In a brake, a wheel carrying a brake-drum, an axle-housing carrying a non-rotational member, a rotatable ring within the brake-drum, means mounted on said member for rotating said ring, a plurality of brake-shoe-members within the drum, means for actuating the same through the medium of said ring, a dust-excluding ring supported between said brake-shoe-members and the adjacent wall of the drum, and resilient means thrusting against said dust-excluding ring and serving to hold the brake-shoe-members in place and against rattling.

In testimony whereof I hereunto affix my signature.

BENJAMIN F. BOONE.